United States Patent [19]
Shibaguchi

[11] Patent Number: 5,587,826
[45] Date of Patent: Dec. 24, 1996

[54] OPTICAL BEAM SCANNING APPARATUS ADJUSTING FOCAL POINT OVER ENTIRE IMAGE FORMING AREA BY FEEDBACK CONTROL

[75] Inventor: Takashi Shibaguchi, Yokohama, Japan

[73] Assignee: Ricoh Company, Ltd., Tokyo, Japan

[21] Appl. No.: 607,456

[22] Filed: Feb. 27, 1996

Related U.S. Application Data

[62] Division of Ser. No. 420,507, Apr. 12, 1995, Pat. No. 5,541,761.

[30] Foreign Application Priority Data

Apr. 14, 1994 [JP] Japan ................................... 6-075813
Jun. 28, 1994 [JP] Japan ................................... 6-146086

[51] Int. Cl.⁶ ................................................. G02B 26/10
[52] U.S. Cl. ........................... 359/216; 359/206; 359/319; 250/236
[58] Field of Search .................................... 359/205–219, 359/315, 319; 347/248–250, 255–261; 250/201.2, 201.4, 201.5, 201.8, 206.1, 206.2, 234–236; 358/474, 296

[56] References Cited

U.S. PATENT DOCUMENTS

| | | | |
|---|---|---|---|
| 5,033,806 | 7/1991 | Tomita et al. ............................ | 359/319 |
| 5,124,835 | 6/1992 | Shibaguchi et al. ..................... | 359/319 |
| 5,196,697 | 3/1993 | Arimoto et al. ......................... | 250/236 |

*Primary Examiner*—James Phan
*Attorney, Agent, or Firm*—Oblon, Spivak, McClelland, Maier & Neustadt, P.C.

[57] ABSTRACT

In an optical beam scanning apparatus having an electrooptic lens, a focal point of a light beam is adjusted to be exactly positioned on a scanning surface by a feedback control at any positions scanned by the light beam during a single scanning period. A deviation of a focal position of the light beam relative to the scanning surface is detected, and a detection signal corresponding to the deviation of the focal position is output. A focusing signal is stored and supplied which corresponds to the detection signal obtained when a focal position of the light beam is exactly positioned on the scanning surface. A differential signal is obtained as a difference between the focusing signal and the detection signal. A level of a driving voltage to be supplied to the electrooptic lens is controlled by a driving voltage controlling signal which is a sum of the differential signal and the focusing signal.

7 Claims, 12 Drawing Sheets

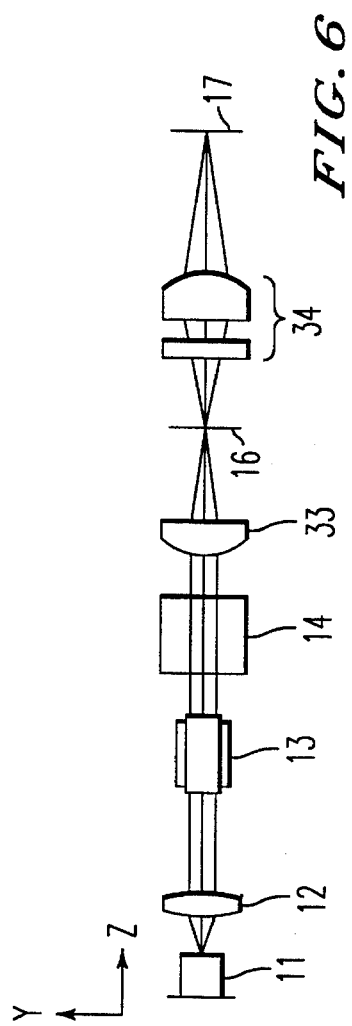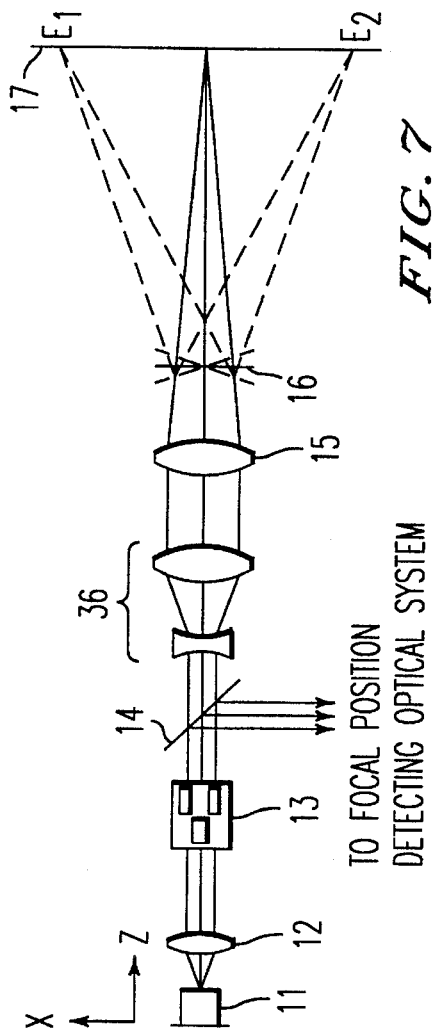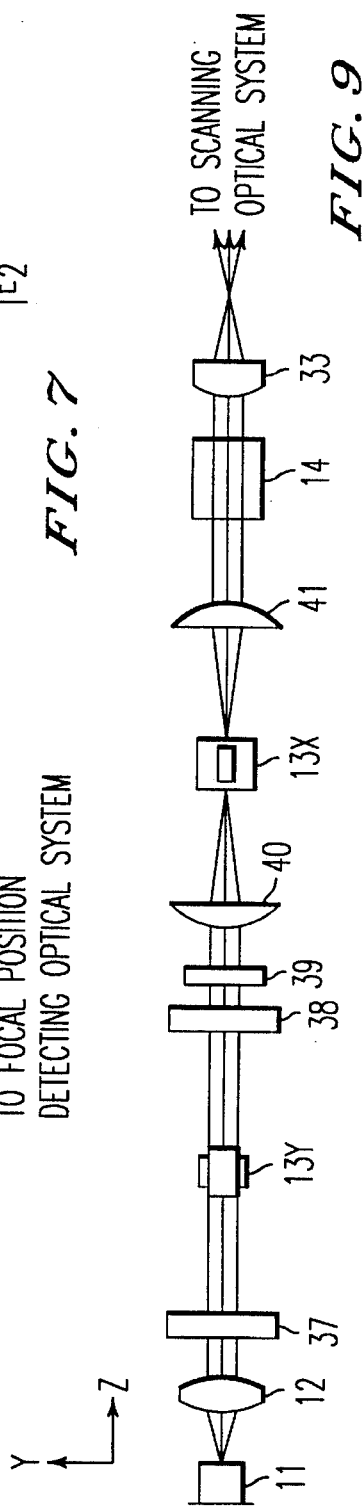

TO ELECTROOPTICAL LENS

OPTICAL BEAM SCANNING APPARATUS ADJUSTING FOCAL POINT OVER ENTIRE IMAGE FORMING AREA BY FEEDBACK CONTROL

This is a division of application Ser. No. 08/420,507, filed on Apr. 12, 1995, now U.S. Pat. No. 5,541,761.

BACKGROUND OF THE INVENTION

1. Field of the Invention

The present invention generally relates to optical beam scanning apparatuses, and more particularly to an optical beam scanning apparatus which performs a focal point adjustment over an entire image forming area by using an electrooptic lens which can vary a focal distance under a feedback control.

2. Description of Related Art

In an image forming apparatus such as a digital copy machine, a laser printer or the like, an image is formed on a surface (scanning surface) being scanned by projecting a light beam emitted by a light source which light beam is intensity modulated by an image signal. Before the light beam is projected onto the scanning surface, the scanning surface is uniformly charged, and then the light beam is projected onto the scanning surface by being deflected toward the scanning surface by a deflecting apparatus.

Such an image forming apparatuses has been suggested in Japanese Laid-Open Patent Application No. 2-293809. In this image forming apparatus, a distortion of an image formed on the scanning surface is corrected by using an electrooptic lens which varies a focal point of an image forming system by using a driving voltage supplied thereto.

In the above-mentioned image forming apparatus, there is a problem in that an image forming point of the light beam deviates from a point on the scanning surface because of variation of a focal point of the electrooptic lens due to a temperature change in the image forming apparatus. The variation of a focal point may occur due to self-heat generation while the electrooptic lens is operated. Additionally, the image forming point may deviate during an extended period of use because characteristics of the electrooptic lens may change due to aging of the lens. Further, there is another problem in that a variation of a focal distance does not exactly follow a waveform of a driving voltage supplied to the electrooptic lens due to a response delay of the electrooptic lens during an operation or due to a hysteretic characteristic of the electrooptic lens.

SUMMARY OF THE INVENTION

It is a general object of the present invention to provide an improved and useful optical beam scanning apparatus in which the above-mentioned problems are eliminated.

A more specific object of the present invention is to provide an optical beam scanning apparatus in which a focal point of a light beam is adjusted to be exactly positioned on a scanning surface at any positions scanned by the light beam during a single scanning period.

In order to achieve the above-mentioned objects, there is provided according to one aspect of the present invention an optical beam scanning apparatus comprising:

a light source emitting a linearly polarized light beam;

deflecting means for deflecting the light beam toward a scanning surface on which an image is formed by a scanning operation defined by the light beam being projected from said deflecting means onto said scanning surface;

a first image forming optical system provided between the light source and the deflecting means, focusing the light beam on the scanning surface, the first image forming optical system including an electrooptic lens having a variable focal distance so that a focal distance of the first image forming optical system is varied in synchronization with the scanning operation;

light beam splitting means for splitting the light beam after the light beam has passed through the electrooptic lens into a first split light beam and a second split light beam, the first split light beam being directed toward the deflecting means;

focal position detecting means for detecting a deviation of a focal position of the first split light beam relative to the scanning surface by use of the second split light beam, and for outputting a detection signal corresponding to the deviation of the focal position;

focusing signal supplying means for storing and supplying a focusing signal which corresponds to the detection signal obtained when a focal position of the first split light beam is positioned on the scanning surface;

differential signal generating means for generating a differential signal by obtaining a difference between the focusing signal output from the focusing signal supplying means and the detection signal output from the focal position detecting means; and driving voltage generating means for generating a driving voltage supplied to the electrooptic lens, the driving voltage being controlled by a driving voltage controlling signal which is a sum of the differential signal output from the differential signal generating means and the focusing signal output from the focusing signal supplying means.

Additionally, there is provided according to another aspect of the present invention an optical beam scanning apparatus comprising:

a light source emitting a linearly polarized light beam;

deflecting means for deflecting the light beam toward a scanning surface on which an image is formed by a scanning operation defined by the light beam being projected from the deflecting means onto the scanning surface;

a first image forming optical system provided between the light source and the deflecting means focusing the light beam on the scanning surface, the first image forming optical system including an electrooptic lens having a variable focal distance so that a focal distance of the first image forming optical system is varied in synchronization with the scanning operation;

light beam splitting means for splitting the light beam after the light beam has passed through the electrooptic lens into a first split light beam and a second split light beam, the first split light beam being directed toward the deflecting means;

focal position detecting means for detecting a deviation of a focal position of the first split light beam relative to the scanning surface by use of the second split light beam, and for outputting a detection signal corresponding to the deviation of the focal position;

focusing signal supplying means for storing and supplying a focusing signal which corresponds to the detection signal obtained when a focal position of the first split light beam is positioned on the scanning surface;

direct current reference signal generating means for generating and outputting a direct current reference signal having a predetermined constant level;

differential signal generating means for generating a differential signal between the direct current reference signal output from the direct current reference signal generating means and the detection signal output from the focal position detecting means;

driving voltage generating means for generating a driving voltage supplied to the electrooptic lens, the driving voltage being controlled by a driving voltage controlling signal which is a sum of the differential signal output from the differential signal generating means and the focusing signal output from the focusing signal supplying means; and synchronization signal generating means, provided adjacent to the scanning surface, for generating a synchronization signal by detecting the light beam projected from the deflecting means onto the scanning surface, the synchronization signal used for controlling starting timing for a scanning operation and an output timing for outputting the detection signal from the focal position detecting means so that the differential signal is output for each scanning period in the absence of an image being formed on the scanning surface.

According to the above-mentioned invention, since the electrooptic lens is operated by a feedback control using the driving voltage controlling signal which is a sum of the differential signal and the focusing signal, the focal point (the image forming point) of the light beam projected form the deflecting means is always positioned on the scanning surface during a single scanning period.

Other objects, features and advantages of the present invention will become apparent from the following detailed description when read in conjunction with the accompanying drawings.

BRIEF DESCRIPTION OF THE DRAWINGS

FIG. 6 is an illustration of the optical system shown in FIG. 5, viewed from a primary scanning direction (X-direction);

FIG. 7 is an illustration of a part of a fourth embodiment of the optical beam scanning apparatus according to the present invention;

FIG. 9 is an illustration of the optical system shown in FIG. 8, viewed from a primary scanning direction (X-direction);

DETAILED DESCRIPTION OF THE PREFERRED EMBODIMENTS

Figure 1:
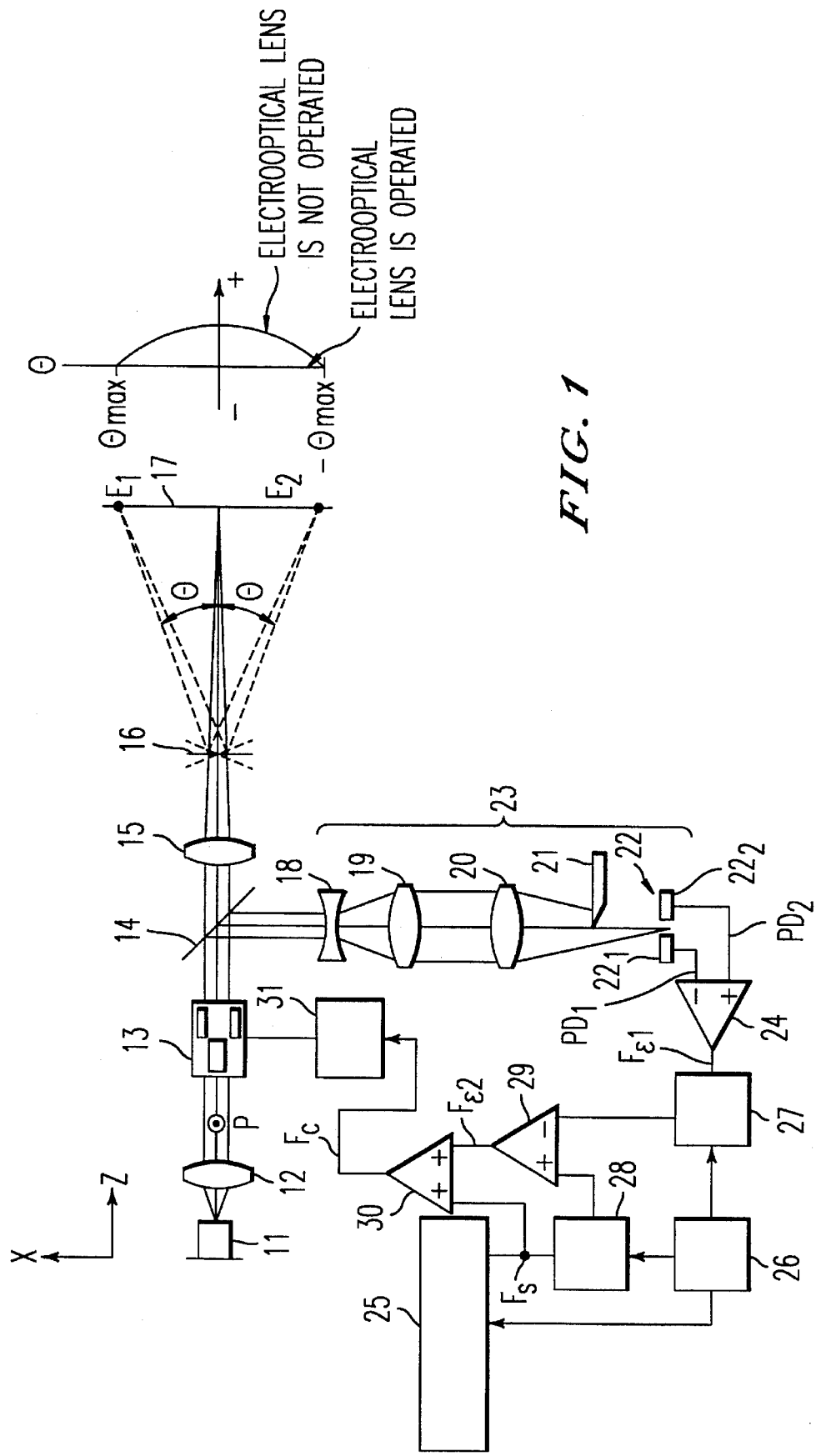
FIG. 1 is an illustration of a first embodiment of an optical beam scanning apparatus according to the present invention, viewed from a secondary scanning direction (Y-direction)
Figure 2:
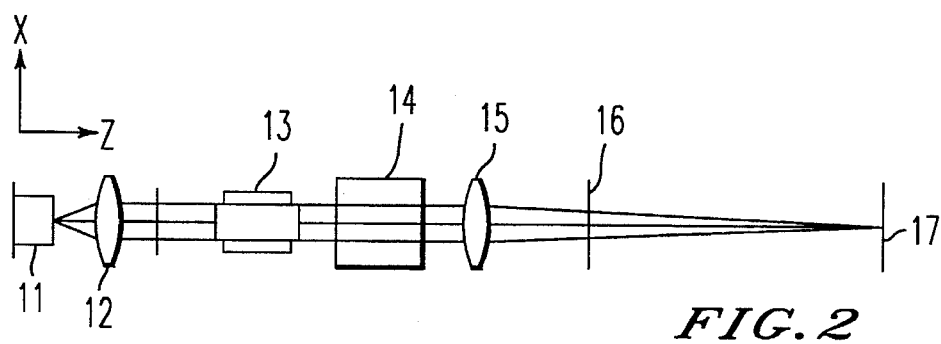
FIG. 2 is an illustration of an optical system shown in FIG. 1, viewed from a primary scanning direction (X-direction)

A description will now be given, with reference to FIGS. 1 and 2, of a first embodiment of an optical beam scanning apparatus according to the present invention. FIG. 1 is an illustration of the first embodiment of the optical beam scanning apparatus according to the present invention, viewed from a secondary scanning direction (Y-direction). FIG. 2 is an illustration of an optical system shown in FIG. 1, viewed from a primary scanning direction (X-direction).

In FIG. 1, a semiconductor laser 11, which corresponds to a light source, emits a light beam which is linearly polarized and intensity modulated by an image signal in a semiconductor driving circuit not shown in the figure. The light beam emitted from the semiconductor laser 11 is collimated by a collimate lens 12, a direction P of a paralyzation of the collimated light beam matching to the secondary scanning direction (Y-direction). The collimated light beam output from the collimate lens 12 is then incident on an electrooptic lens 13 which can vary the focal distance.

The light beam output from the electrooptic lens 13 is split into two light beams by a half mirror 14 which corresponds to a light beam splitting means. One of the two split light beams is projected onto a scanning surface 17 by passing through an image forming lens 15, which corresponds to a first image forming optical system, and is deflected by a rotational polygon mirror 16, which corresponds to deflecting means. Accordingly, an image is formed on the scanning surface 17. The scanning surface 17 is formed on a recording media which is comprised of a photosensitive drum or a photosensitive belt. As is well known in the art, the scanning surface 17 is uniformly charged while the recording media is rotated in an image forming apparatus, and then the scanning surface 17 is exposed to the scanning light beams as mentioned above so that a latent image is formed on the scanning surface 17. The latent image is then developed by a developing apparatus and then transferred onto a recording sheet by a transferring apparatus.

In the above-mentioned optical beam scanning apparatus, if the electrooptic lens 13 is not operated during an image forming process, an image forming point of the light beam projected from the rotational polygon mirror 16 deviates from a line on the scanning surface 17 and traces an ark-like line, as shown in FIG. 1, which protrudes in the secondary scanning direction, and thus a distortion is generated in the image formed on the scanning surface 17. This distortion of the image can be eliminated by correcting a position of the image forming point of the light beam by applying a driving voltage to the electrooptic lens 13. The driving voltage is applied according to a deflection angle θ of the light beam projected from the rotational polygon mirror 16.

The other of the two split light beams is incident on a focal position detecting optical system 23, which corresponds to focal position detecting means, comprising lenses 18 and 19, a detection lens 20, a knife edge 21 and a split photodiode corresponding to split photo-detecting element. The lenses 18 and 19 constitute a beam expander which expands a beam diameter of the split light beam. The split photodiode 22 comprises two split diodes $22_1$ and $22_2$. In the focal position detecting optical system 23, a deviation of a focal point relative to the scanning surface 17 is detected by means of a knife edge method.

A beam diameter of the light beam incident on the electrooptic lens 13 is regularly set to approximately 1 mm so as to reduce the driving voltage to be supplied to the electrooptic lens 13. The split light beam incident on the focal position detecting optical system 23 is expanded by the beam expander comprising the lenses 18 and 19 so as to increase sensitivity in detecting a deviation of the focal distance. The expanded light beam is then incident on the split photodiode 22 via the detecting lens 20 and the knife edge 21.

A differential amplifier 24 amplifies a difference (PD2−PD1) between an output PD1 from the split diode $22_1$ and an output PD2 from the split diode $22_2$.

It is assumed that the focal position detecting optical system 23 is adjusted so that an output signal (differential signal) $F_\Sigma 1$ is equal to 0 when the light beam projected from the rotational polygon mirror 16 forms an image on opposite ends (scanning positions) E1 and E2 on a scanning area of the scanning surface 17. If the light beam is defocused at the scanning positions E1 and E2 which condition is caused by the electrooptic lens 13 being subjected to a temperature change or aging, or by a response delay or a hysteretic characteristic of the electrooptic lens 13, the image forming point of the light beam projected from the rotational polygon mirror 16 is moved from a position on the scanning surface 17 in the minus Z-direction along an optical axis, which direction is toward the rotational polygon mirror 16 when $F_\Sigma=(PD2-PD1)>0$. When $F_\Sigma=(PD2-PD1)<0$, the image forming point of the light beam projected from the rotational polygon mirror 16 is moved from the point on the scanning surface 17 in the plus Z-direction. In order to maintain the image forming point at a position on the scanning surface 17, if $F_\Sigma 1 <O$, the driving voltage supplied to the electrooptic lens 13 is increased, and if $F_\Sigma 1>0$, the driving voltage supplied to the electrooptic lens 13 is decreased. Accordingly, the image forming point is always positioned at the scanning positions E1 and E2.

Figure 3:
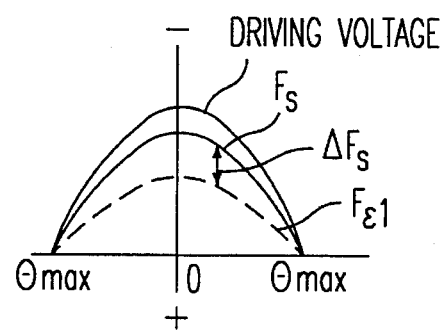
FIG. 3 is a graph showing a driving voltage and a differential signal in the first embodiment shown in FIG. 1.

Additionally, if the driving voltage supplied to the electrooptic lens 13 is controlled so that an image forming point of the light beam projected from the rotational polygon mirror 16 is positioned on the scanning surface 17, the driving voltage is decreased as the deflection angle θ is increased, and becomes equal to 0 when the deflection angle θ is at its maximum ($θ_{max}$). As shown in FIG. 3, the differential signal $F_\Sigma 1$ output from the differential amplifier 24 is greater than 0, and the differential signal $F_\Sigma 1$ is decreased as the deflection angle θ is increased.

A description will now be given of an operation in which the image forming point of the light beam projected from the rotational polygon mirror 16 is positioned at any points on an entire scan line on the scanning surface 17 regardless of a temperature change or aging of the electrooptic lens 13.

In the present embodiment, a memory unit 25, which corresponds to focusing signal supplying means, is provided which stores a focusing signal Fs a value of which corresponds to the focusing signal $F_\Sigma 1$ being obtained at an initial scanning operation of the optical image scanning apparatus. That is, the focusing signal Fs represents the differential signal $F_\Sigma 1$ which is obtained when the image forming point of the light beam projected from the rotational polygon mirror 16 is positioned on the scanning surface 17 at any points on a scan line during a single scanning period. It should be noted that the focusing signal Fs is stored in the memory unit 25 by an initialization.

The memory unit 25 outputs the focusing signal Fs at the same rate with the scanning speed of the light beam projected from the rotational polygon mirror 16 in accordance with a synchronization signal (timing signal) input from a timing signal generating unit 26, which synchronization signal indicates a start timing of the scanning operation performed by the light beam projected from the rotational polygon mirror 16. A sample hold circuit 27 samples and holds the differential signal $F_\Sigma 1$ output from the differential amplifier 24 according to the timing signal output from the timing signal generating unit 26. A sample hold circuit 28 samples and holds the differential signal Fs output from the memory unit 25 according to the timing signal output from the timing signal generating unit 26.

A differential amplifier 29, which corresponds to differential signal generating means, outputs a differential signal $F_\Sigma 2=(Fs-F_\Sigma 1)$ by comparing the differential signal $F_\Sigma 1$ output from the sample hold circuit 27 with the focusing signal Fs output from the sample hold circuit 28. If the differential signal $F_\Sigma 1$ deviates from the focusing signal Fs by ΔFs as shown in FIG. 3, $F_\Sigma 1$ becomes equal to Fs+ΔFs ($F_\Sigma 1$=Fs+ΔFs), and thus $F_\Sigma 2$ becomes equal to −ΔFs ($F_\Sigma 2$=−ΔFs). That is, the differential signal $F_\Sigma 2$ generated during a single scanning period represents a focus error signal at any points on a scanning line on the scanning surface 17.

An adder 30, which corresponds to adding means, adds the differential signal $F_\Sigma 2$ output from the differential amplifier 29 to the focusing signal Fs output from the memory unit 25 so as to obtain a driving voltage controlling signal used for controlling the driving voltage supplied to the electrooptic lens 13. A driving voltage generating circuit 31, which corresponds to driving voltage generating means, is controlled by the driving voltage controlling signal Fc=($F_\Sigma 2$+Fs) output from the adder 30 so that the electrooptic lens 13 is driven by the driving voltage the level of which is controlled by the driving voltage controlling signal Fc.

As a result, a feedback control for the driving voltage supplied to the electrooptic lens 13 is performed by using the driving voltage controlling signal Fc which is based on the focusing signal Fs at any of the scanning positions on the scanning surface 17. Accordingly, the image forming point of the light beam projected from the rotational polygon mirror 16 can always be positioned on the scanning surface 17 during a single scanning period. It should be noted that since no output is obtained from the differential amplifier 24 when the semiconductor laser 11 is in an off state, the sample hold circuits 27 and 28 hold the signals $F_{\Sigma 1}1$ and Fs, respectively, until the semiconductor laser 11 is turned on. The signals are held according to the timing signal output from the timing signal generating unit 26. When the semiconductor laser 11 is turned on, the signals held in the signal hold circuits are output.

As mentioned above, in the present embodiment, since the electrooptic lens 13 is controlled by the driving voltage controlling signal Fc which is a sum of the differential signal $F_x 2$ and the focusing signal Fs, the focal point (the image forming point) of the light beam projected form the rotational polygon mirror 16 can always be positioned on the scanning surface 17 during a single scanning period.

Figure 4:
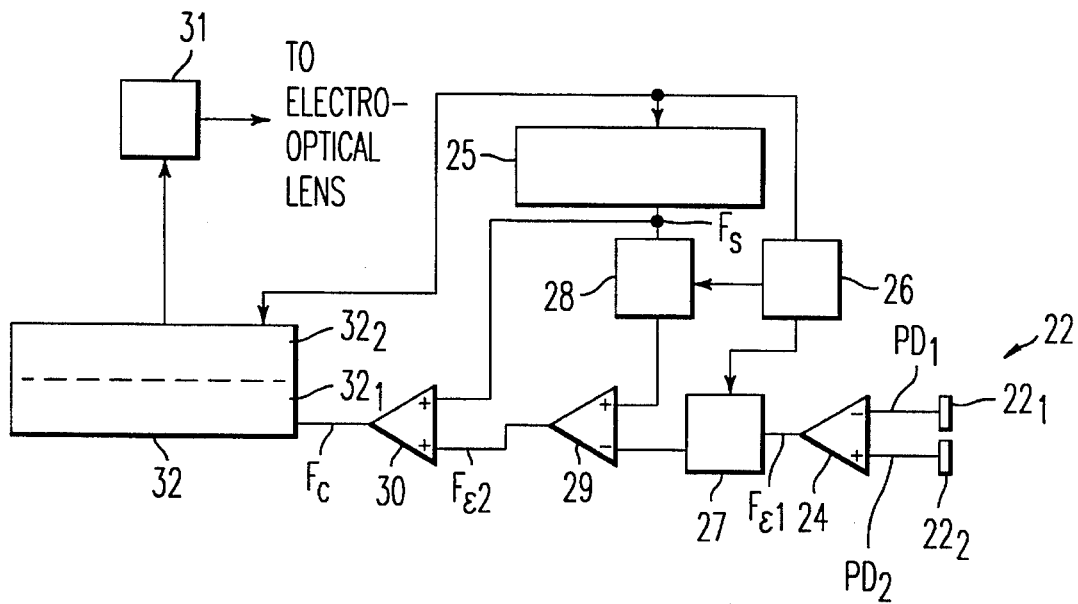
FIG. 4 is a block diagram of an electric circuit of a second embodiment of the optical beam scanning apparatus according to the present invention.

A description will now be given of a second embodiment of an optical beam scanning apparatus according to the present invention. FIG. 4 is a block diagram of an electric circuit of the second embodiment of the optical beam scanning apparatus according to the present invention. In FIG. 4, parts that are the same as the parts shown in FIG. 1 are given the same reference numerals, and descriptions thereof will be omitted.

The second embodiment is different from the above-mentioned first embodiment in that a memory unit 32 is provided in the second embodiment between the adder 30 and the driving voltage generating circuit 31 of the first embodiment. The memory unit 32 comprises a memory $32_1$ and a memory $32_1$ so as to store the driving voltage controlling signal Fc corresponding to two scanning periods. The driving voltage controlling signal Fc corresponding to a single scanning period is obtained in the same manner as that of the first embodiment, and is stored in the memory $32_1$. The driving voltage controlling signal Fc corresponding to a single scanning period stored in the memory $32_2$ is output to the driving voltage generating circuit 31 according to a synchronization signal supplied by the timing signal generating unit 26 in the same manner as described in the first embodiment. At the same time the driving voltage controlling signal Fc corresponding to a single scanning period is input from the adder 30 to the memory unit 32, and is stored in the memory $32_1$ according to the timing signal (the synchronization signal) from the timing signal generating unit 26. The driving voltage controlling signal Fc stored in the memory $32_1$ is transferred to the memory $32_2$ immediately after a single scanning operation is completed.

By repeating the above-mentioned operation, the driving voltage supplied to the electrooptic lens 13, which driving voltage corresponds to a single scanning period, is controlled based on the driving voltage controlling signal Fc corresponding to one scanning period prior to the current scanning period. Accordingly, a feedback control is performed on the basis of each scanning period, and thus a focal point of the light beam projected from the rotational polygon mirror 16 can always be positioned on the scanning surface 17. It should be noted that the memory unit 32 is not limited to a memory unit having two memories, each storing the driving voltage controlling signal Fc corresponding to a single scanning period, and any memory unit which can store the driving voltage controlling signal Fc corresponding to more than one scanning period may be used.

In the above-mentioned second embodiment, since the driving voltage controlling signal corresponding to a single scanning period is used as the driving voltage controlling signal for the next control of the driving signal, the control of the driving voltage supplied to the electrooptic lens 13 can be performed with only a response delay corresponding to a single scanning period.

In the above-mentioned first and second embodiments, although a displacement of a focal point of the light beam projected from the rotational polygon mirror 16 is detected by using the knife edge method, a method, such as an astigmatism method, may instead be used.

Figure 5:
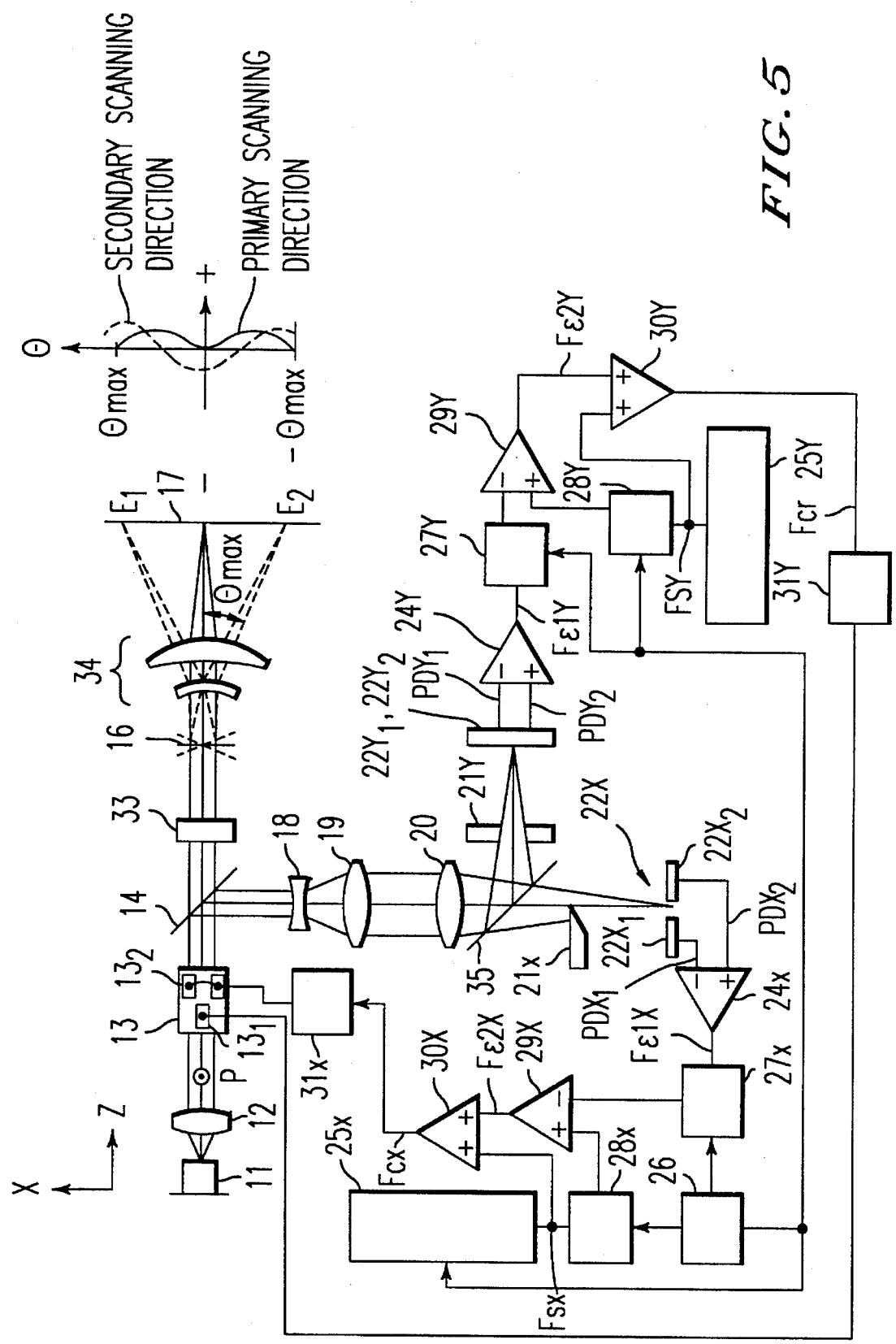
FIG. 5 is an illustration of a third embodiment of the optical beam scanning apparatus according to the present invention, viewed from a secondary scanning direction (Y-direction)

A description will now be given, with reference to FIGS. 5 and 6, of a third embodiment of an optical beam scanning apparatus according to the present invention. FIG. 5 is an illustration of the third embodiment of an optical beam scanning apparatus according to the present invention, viewed from a secondary scanning direction (Y-direction). FIG. 6 is an illustration of an optical system shown in FIG. 5, viewed from a primary scanning direction (X-direction). In FIGS. 5 and 6, parts that are the same as the parts shown in FIG. 1 are given the same reference numerals, and descriptions thereof will be omitted.

In the third embodiment, a light beam emitted from a semiconductor laser 11 is collimated by collimate lens 12. An electrooptic lens 13 and a cylindrical lens 33 together constitute a first image forming optical system so that the light beam passing therethrough is focused on a scanning surface 17 after being deflected by a rotational polygon mirror 16. Since the cylindrical lens 33 has a power in the Y-direction, the light beam passing through the cylindrical lens 33 forms a line image extending in the X-direction. The light beam passing through the cylindrical lens 33 is deflected by the rotational polygon mirror 16, and then passes through a second image forming optical system comprising fθ lens 34. The fθ lens 34 is an anamorphic lens system, and a reflecting surface of the rotational polygon mirror 16 and the scanning surface 17 are in an optically conjugate relationship so that an inclination of the reflecting surface of the rotational polygon mirror 16 relative to the Y-direction is corrected.

In the third embodiment, when the electrooptic lens 13 is not operated, distortions in the primary scanning direction (the X-direction) and the secondary scanning direction (the Y-direction) are generated as shown in FIG. 5. The distortions are corrected by independently varying focal distance of the electrooptic lens 13 in the X direction and the Y-direction. The focal distance of the electrooptic lens 13 in the X-direction is varied by varying a driving voltage applied across pairs of electrodes $13_2$, and the focal distance of the electrooptic lens 13 in the Y-direction is varied separately from that in the Y-direction by varying a driving voltage applied across a pair of electrodes $13_1$.

The light beam output from the electrooptic lens 13 is split into two split beams by a half mirror 14 which corresponds to optical beam splitting means. One of the two split beams is projected onto the scanning surface 17 by being passed through the cylindrical lens 33, the rotational polygon mirror 16 and the fθ lens 34. The other of the two split beams is incident on a beam expander comprising lenses 18 and 19 so that a beam diameter of the split beam is expanded. The split beam passed through the beam expander is then passed through a detection lens 20 and then split into two split beams by a half mirror 35, which corresponds to optical beam splitting means.

One of the split beams passed through the half mirror 35 is incident, via a knife edge 21X, on a split detection element 22X comprising two split photodiodes $22X_1$ and $22X_2$. A differential amplifier 24X amplifies a difference (PDX2-PDX1) between an output PDX1 from the split photodiode $22X_1$ and an output PDX2 from the split photodiode $22X_2$. The beam expander comprising the lenses 18 and 19, the detection lens 20, the knife edge 21X and the split photodiode 22X together constitute a focal position detecting optical system which constitutes, together with the deferential amplifier 24X, X-direction focal position detecting means.

The other of the split beams passing through the half mirror 35 is incident, via a knife edge 21Y, on a split detection element 22Y comprising two split photodiodes $22Y_1$ and $22Y_2$. A differential amplifier 24Y amplifies a difference (PDY2-PDY1) between an output PDY1 from the split photodiode $22Y_1$ and an output PDY2 from the split photodiode $22Y_2$. The beam expander comprising the lenses 18 and 19, the detection lens 20, the knife edge 21Y and the split photodiode 22Y together constitute a focal position detecting optical system which constitutes, together with the differential amplifier 24Y, Y-direction focal position detecting means.

The focal position detecting optical systems provided for the X-direction is adjusted so that an output signal (differential signal) $F_\Sigma 1X$ is equal to 0 when the light beam projected from the rotational polygon mirror 16 forms an image on opposite ends (scanning positions) E1 and E2 on a scanning area on the scanning surface 17. If the electrooptic lens 13 is not operated, the distortions of an image in the primary scanning direction (the X-direction) and the secondary scanning direction (the Y-direction) are generated as shown in FIG. 5 because an image forming point of the light beam passing through the fθ lens 34 deviates from a plane on which the image forming point is to be positioned. The distortions of the image are corrected by independently varying focal distances of the electrooptic lens 13 in the X-direction and the Y-direction by varying a driving voltage applied across the pair of electrodes $13_1$ or the pairs of electrodes $13_2$.

In the present embodiment, a memory unit 25X, which corresponds to focusing signal supplying means, is provided which stores a focusing signal Fsx a value of which corresponds to the focusing signal $F_\Sigma 1X$ being obtained at an initial scanning operation of the optical image scanning apparatus. That is, the focusing signal Fsx represents the differential signal $F_\Sigma 1 X$ which is obtained when the image forming point of the light beam projected from the rotational polygon mirror 16 is positioned on the scanning surface 17 at any points on a scan line during a single scanning period. The focusing signal Fsx is stored in the memory unit 25X by an initialization.

The memory unit 25X outputs the focusing signal Fsx at the same rate with the scanning speed of the light beam projected from the fθ lens 34 in accordance with a synchronization signal (timing signal) input from a timing signal generating unit 26, which synchronization signal represents a start timing of the scanning operation performed by the light beam projected from the fθ lens 34. A sample hold circuit 27X samples and holds the differential signal $F_\Sigma 1X$ output from the differential amplifier 24X according to the timing signal output from the timing signal generating unit 26. A sample hold circuit 28X samples and holds the differential signal Fsx output from the memory unit 25X according to the timing signal output from the timing signal generating unit 26.

A differential amplifier 29X, which corresponds to differential signal generating means, outputs a differential signal $F_\Sigma 2X=(Fsx-F_\Sigma 1X)$ by comparing the differential signal F 1X output from the sample hold circuit 27X with the focusing signal Fsx output from the sample hold circuit 28X. The differential signal $F_\Sigma 2X$ generated during a single scanning period represents a focus error signal at any point on a scanning line on the scanning surface 17 in the X-direction.

An adder 30X, which corresponds to adding means, adds the differential signal $F_\Sigma 2X$ output from the differential amplifier 29X to the focusing signal Fsx output from the memory unit 25X so as to obtain a driving voltage controlling signal used for controlling the driving voltage supplied to the pairs of the electrodes $13_2$ of the electrooptic lens 13. A driving voltage generating circuit 31X, which corresponds to driving voltage generating means, is controlled by the driving voltage controlling signal $Fcx=(F_\Sigma 2X+Fsx)$ output from the adder 30X so that the electrooptic lens 13 is driven by the driving voltage corresponding to the driving voltage controlling signal Fcx.

As a result, a feedback control for the driving voltage applied to the pairs of the electrodes $13_2$ of the electrooptic lens 13 is performed by using the driving voltage controlling signal Fcx which is based on the focusing signal Fsx at any of the scanning positions on the scanning surface 17. Accordingly, the image forming point of the light beam projected from the fθ lens 34 can always be positioned on the scanning surface 17 during a single scanning period with respect to the X-direction.

A memory unit 25Y, which corresponds to focusing signal supplying means, is provided which stores a focusing signal Fsy a value of which corresponds to the focusing signal $F_\Sigma 1Y$ being obtained at an initial scanning operation of the optical image scanning apparatus. That is, the focusing signal Fsy represents the differential signal $F_\Sigma 1Y$ which is obtained when the image forming point of the light beam projected from the rotational polygon mirror 16 is positioned on the scanning surface 17 at any points on a scan line during a single scanning period. The focusing signal Fsy is stored in the memory unit 25Y by an initialization.

The memory unit 25Y outputs the focusing signal Fsy at the same rate with the scanning speed of the light beam projected from the fθ lens 34 in accordance with a synchronization signal (timing signal) input from a timing signal generating unit 26, which synchronization signal represents a start timing of the scanning operation performed by the light beam projected from the fθ lens 34. A sample hold circuit 27Y samples and holds the differential signal $F_\Sigma 1Y$ output from the differential amplifier 24Y according to the timing signal output from the timing signal generating unit 26. A sample hold circuit 28Y samples and holds the differential signal Fsy output from the memory unit 25Y according to the timing signal output from the timing signal generating unit 26.

A differential amplifier 29Y, which corresponds to differential signal generating means, outputs a differential signal $F_\Sigma 2Y=(Fsy-F_\Sigma 1Y)$ by comparing the differential signal $F_\Sigma 1Y$ output from the sample hold circuit 27Y with the focusing signal Fsy output from the sample hold circuit 28Y. The differential signal $F_\Sigma 2Y$ generated during a single scanning period represents a focus error signal at any points on a scanning line on the scanning surface 17 in the Y-direction.

An adder 30Y, which corresponds to adding means, adds the differential signal $F_\Sigma 2Y$ output from the differential amplifier 29Y to the focusing signal Fsy output from the memory unit 25Y so as to obtain a driving voltage controlling signal used for controlling the driving voltage supplied to the pair of the electrodes $13_1$ of the electrooptic lens 13. A driving voltage generating circuit 31Y, which corresponds to driving voltage generating means, is controlled by the driving voltage controlling signal $Fcy=(F_\Sigma 2Y+Fsy)$ output from the adder 30Y so that the electrooptic lens 13 is driven by the driving voltage corresponding to the driving voltage controlling signal Fcy.

As a result, a feedback control for the driving voltage applied to the pairs of the electrodes $13_1$ of the electrooptic lens 13 is performed by using the driving voltage controlling signal Fcy which is based on the focusing signal Fsx at any of the scanning positions on the scanning surface 17. Accordingly, the image forming point of the light beam projected from the fθ lens 34 can always be positioned on the scanning surface 17 during a single scanning period with respect to the Y-direction.

As mentioned above, in the third embodiment, the focal position of the light beam projected from the fθ lens 34 can always be positioned on the scanning surface 17 by simultaneously and independently correcting the distortions of the image in the X-direction and the Y-direction.

Additionally, in the above-mentioned third embodiment, a memory unit may be provided between the adder 30X and the driving voltage generating circuit 31X and between the adder 30Y and the driving voltage generating circuit 31Y so that the memory unit performs the same function as the memory unit 32 provided in the above-mentioned second embodiment.

It should be noted that, in the above-mentioned third embodiment, the correction of the distortion of the image on the scanning surface 17 may be applied only to either the distortion in the X-direction or the distortion in the Y-direction.

A description will now be given, with reference to FIG. 7, of a fourth embodiment of an optical beam scanning apparatus according to the present invention. FIG. 7 is an illustration of a part of the fourth embodiment of the optical beam scanning apparatus according to the present invention. In FIG. 7, parts that are the same as the parts shown in FIG. 1 are given the same reference numerals, and descriptions thereof will be omitted.

The fourth embodiment has the same construction with the above-mentioned first embodiment except for a beam expanding optical system 36 being provided between an electrooptic lens 13 and a rotational polygon mirror 16. In FIG. 7, the beam expanding optical system 36 is provided between a half mirror 14 and the rotational polygon mirror 16. A light beam passed through the half mirror 14 is expanded in its beam diameter, and the light beam having a larger beam diameter than that of the light beam passing through the electrooptic lens 13 is incident on an image forming lens 15.

Accordingly, the beam diameter of the light beam passing through the electrooptic lens 13 can be reduced, and thus a thickness of the electrooptic lens 13 can be reduced, which condition realizes a low voltage drive of the electrooptic lens 13. It should be noted that a beam expanding optical system similar to that of the fourth embodiment may be applied to the above-mentioned embodiment other than the first embodiment.

Figure 8:
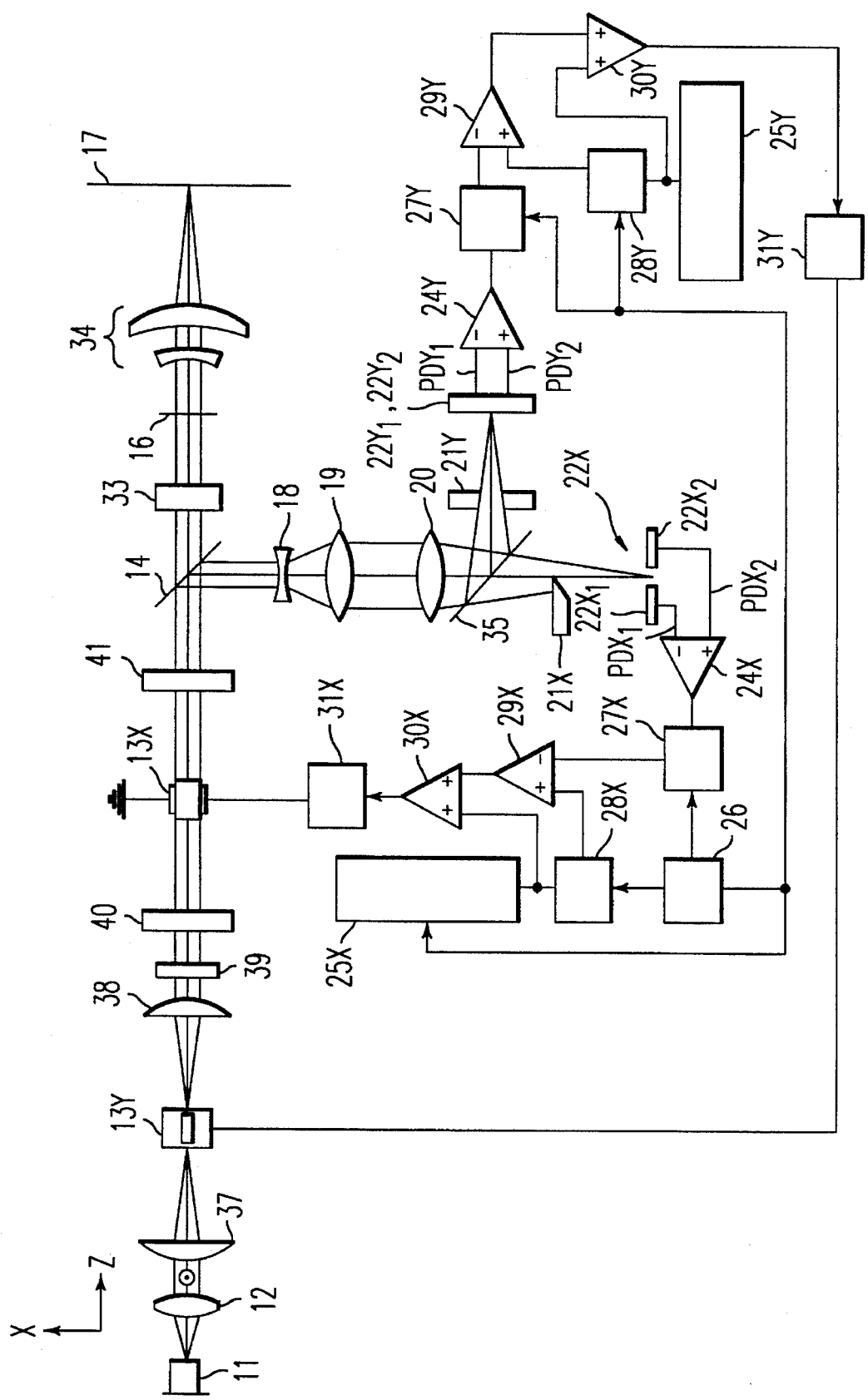
FIG. 8 is an illustration of a fifth embodiment of the optical beam scanning apparatus according to the present invention, viewed from a secondary scanning direction (Y-direction)

A description will now be given, with reference to FIGS. 8 and 9, of a fifth embodiment of an optical beam scanning apparatus according to the present invention. FIG. 8 is an illustration of the fifth embodiment of the optical beam scanning apparatus according to the present invention, viewed from a secondary scanning direction (Y-direction). FIG. 9 is an illustration of an optical system shown in FIG. 8, viewed from a primary scanning direction (X-direction). In FIGS. 8 and 9, parts that are the same as the parts shown in FIG. 5 are given the same reference numerals, and descriptions thereof will be omitted.

In the fifth embodiment, an electrooptic lens 13Y and an electrooptic lens 13X are provided instead of the electrooptic lens 13 of the above-mentioned third embodiment. The electrooptic lens 13Y is provided between cylindrical lenses 37 and 38. The electrooptic lens 13X is provided between the cylindrical lenses 40 and 41. The electrooptic lens 13Y is placed at or near a waist position of a light beam exiting from the cylindrical lens 37, and the electrooptic lens 13X is placed at or near a waist position of the light beam exiting from the cylindrical lens 40.

The light beam exiting from a collimate lens 12 is converged by the cylindrical lens 37 having a power in the X-direction, and enters in the electrooptic lens 13Y. The light beam exiting from the electrooptic lens 13Y is collimated by the cylindrical lens 38 having a power in the X-direction, and then a direction of a polarization is changed to the X-direction by a λ/2 plate 39.

The light beam exiting from the λ/2 plate then incident on the cylindrical lens 40 having a power in the Y-direction. The light beam is converged by the cylindrical lens 40 in the Y-direction and enters in the electrooptic lens 13X. The light beam exiting from the electrooptic lens 13X is collimated by the cylindrical lens 41, and then incident on a half mirror 14. The electrooptic lens 13X is driven by a driving voltage supplied by a driving voltage controlling circuit 31X, and the electrooptic lens 13Y is driven by a driving voltage supplied by a driving voltage controlling circuit 31Y.

In this embodiment, since the electrooptic lenses 13X and 13Y are placed at or near the waist position of the light beam exiting from the cylindrical lenses 37 and 40, respectively, the electrooptic lenses 13X and 13Y can be used at a most effective position to converge the light beam. That is, the waist position of the light beam is positioned in the electrooptic lens 13X and 13Y, a beam width of which waist position is less than other position of the light beam, an area having the least aberration in the electrooptic lenses 13X and 13Y can be used for converging the light beam to vary a focal position of the light beam. Accordingly, a high convergence of the light beam projected from the fθ lens 34 onto the scanning surface 17 can be achieved.

Figure 10:
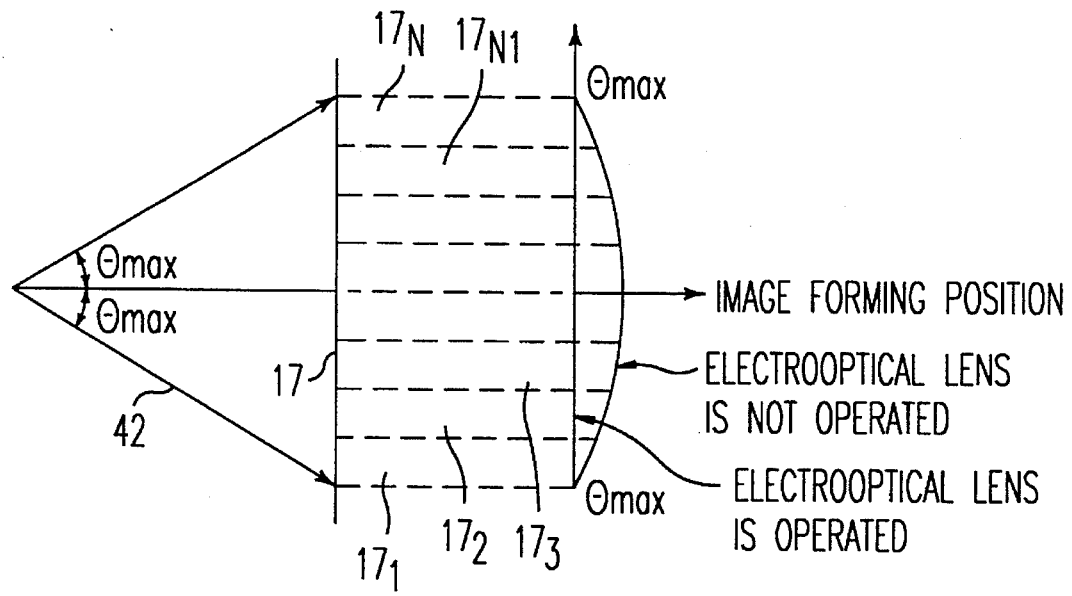
FIG. 10 is an illustration showing a scanning area divided into a plurality of areas.

In each of the above-mentioned first to fifth embodiments, the scanning surface 17 may be divided into a plurality of areas $17_1$ to $17_N$ as shown in FIG. 10. In this case, the differential signal output from the differential amplifier 24, 24X or 24Y is sampled and held by the sample hold circuit 27, 27X or 27Y. Additionally, N memory units 25, 25X, 25Y or 32 are provided which correspond to N areas $17_1$ to $17_N$ so as to store the focusing signal and the driving voltage controlling signal Fc corresponding to each of the N areas. Accordingly, a variation of a focal position may be performed for at least one arbitrary position in the plurality of areas $17_1$ to $17_N$. In such a case, if a distortion of an image is gently changed during a single scanning period, a less number of areas are used. If a distortion is sharply changed, a greater number of areas are used. Accordingly, a frequency of sampling can be greatly reduced particularly in a case in which the distortion is gently changed, and a capacity of the memory unit can thus be greatly reduced.

Figure 11:
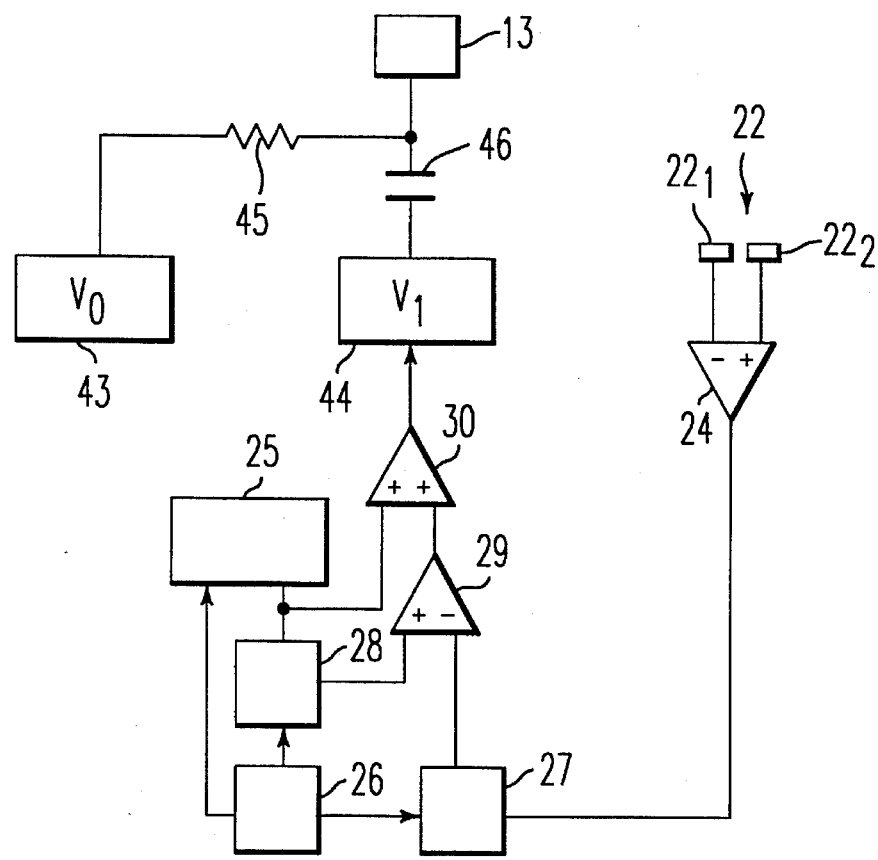
FIG. 11 is a block diagram of an example of a driving voltage generating circuit shown in FIG. 1.

FIG. 11 is a block diagram of an example of the driving voltage generating circuit 31 shown in FIG. 1. In FIG. 11, parts that are the same as the parts shown in FIG. 1 are given the same reference numerals, and descriptions thereof will be omitted.

Figure 12:
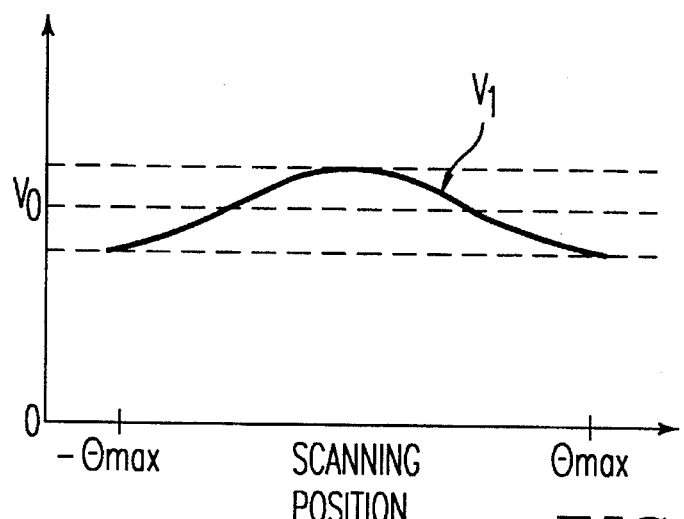
FIG. 12 is a graph showing a driving voltage supplied to an electrooptic lens shown in FIG. 1, the driving voltage is a sum of a bias voltage and a variable driving voltage.

In FIG. 11, the driving voltage generating circuit 31 comprises a direct current bias voltage generating circuit, a variable driving voltage generating circuit, a resistor 45 and a capacitor 46. The direct current bias voltage generating circuit 43 generates a direct current bias voltage $V_0$. The variable driving voltage generating circuit 44 is controlled by the driving voltage controlling signal Fc=($F_x2$+Fs) output from the adder 30 so as to generate a variable driving voltage $V_1$ shown in FIG. 12. The variable driving voltage $V_1$ is supplied to the electrooptic lens 13 via the capacitor 46. At the same time the direct current bias voltage $V_0$ is also supplied to the electrooptic lens 13 via the resistor 45. Accordingly, the electrooptic lens 13 is driven by a driving voltage $(V_1+V_0)$ which is a sum of the direct current bias voltage $V_0$ from the direct current bias voltage generating circuit 43 and the variable driving voltage $V_1$ from the variable driving voltage generating circuit 44.

In this example, since the bias voltage is supplied separately from the variable driving voltage to drive the electrooptic lens 13, an amplitude of the variable driving voltage from the variable driving voltage generating circuit 44 can be less than that supplied when the bias voltage is not supplied, and thus the variable driving voltage generating circuit 44 can be operated at a low voltage so as to reduce a manufacturing cost.

Figure 13:
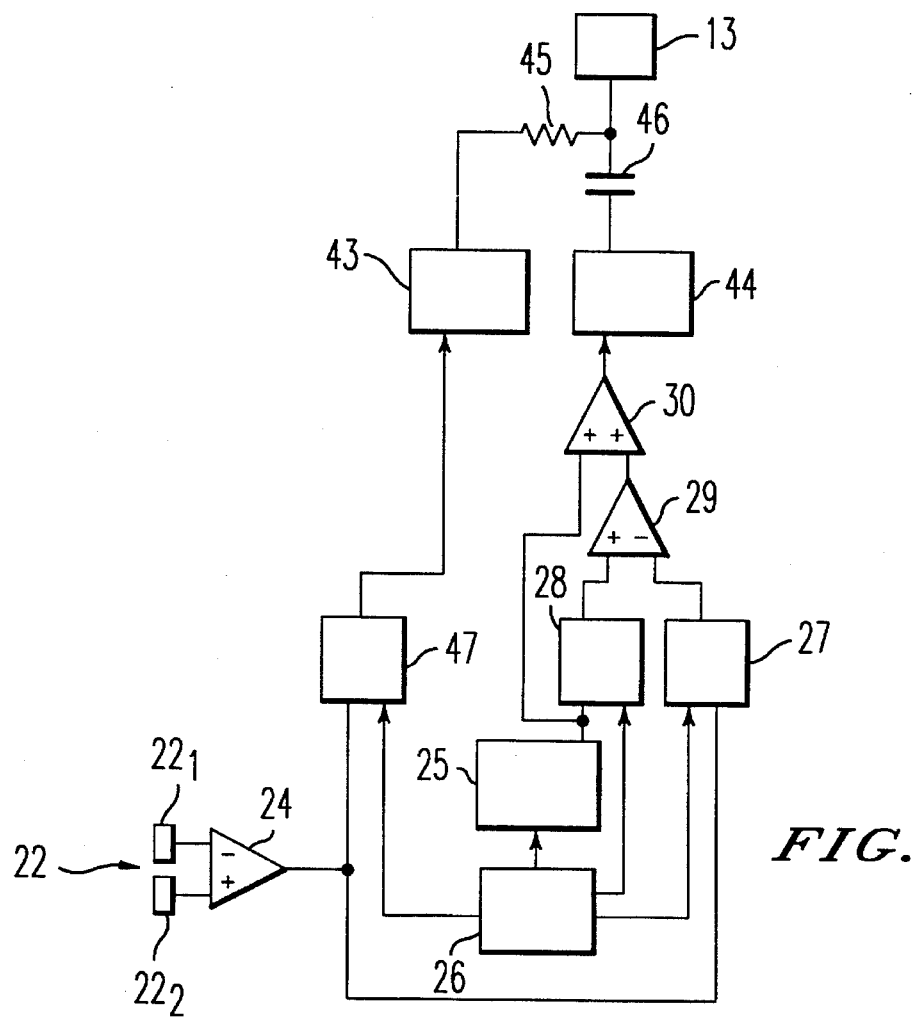
FIG. 13 is a block diagram of a variation of a driving voltage generating circuit shown in FIG. 1.

FIG. 13 is a block diagram of a variation of the driving voltage generating circuit 31 shown in FIG. 1. In FIG. 13, parts that are the same as the parts shown in FIG. 11 are given the same reference numerals, and descriptions thereof will be omitted.

In this variation, the direct current bias voltage generating circuit 43 is controlled by the differential signal $F_\Sigma 1$ output from the sample hold circuit 47 so as to generate a direct current bias voltage $V_0$ which varies according to the differential signal F 1. The sample hold circuit 47 samples and holds the differential signal $F_\Sigma 1$ output from the differential amplifier 24 in accordance with the timing signal output from the timing signal generating unit 26 before a scanning operation is started or after a scanning operation is ended.

In this variation, since the direct current bias voltage generating circuit 43 is controlled by the differential signal $F_\Sigma 1$, a deviation of a focal position of the light beam projected onto the scanning surface 17 can be corrected, which deviation can be caused by a relatively slow change in operational conditions such as temperature change.

Figure 14:
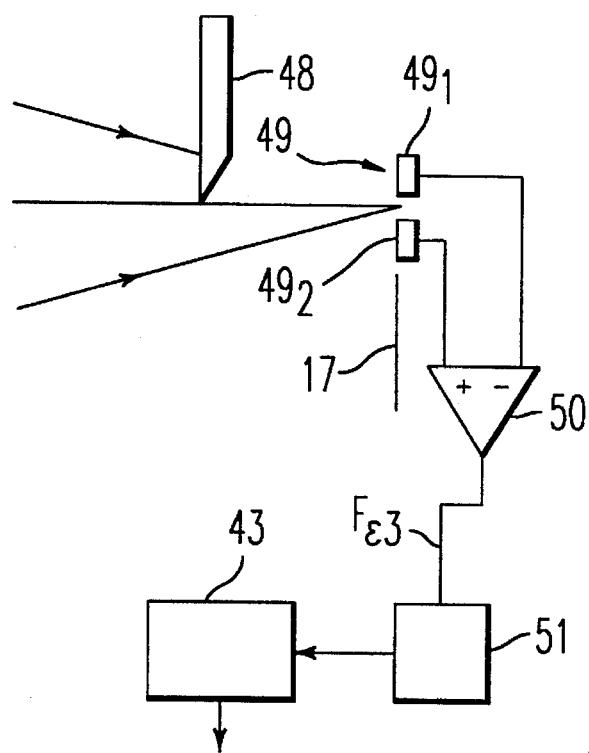
FIG. 14 is a block diagram of another variation of the driving voltage generating circuit shown in FIG. 1.

FIG. 14 is a block diagram of another variation of the driving voltage generating circuit 31 shown in FIG. 1. In FIG. 14, parts that are the same as the parts shown in FIGS. 1 and 11 are given the same reference numerals, and descriptions thereof will be omitted.

In this variation, a focal position detecting optical system is provided near the scanning surface 17, which optical system comprises a knife edge 48 and a split photo-detecting element 49 comprising two split photodiodes $49_1$ and $49_2$. Additionally, a differential amplifier 50 is provided to constitute, together with the above-mentioned optical system, focal position detecting means. The light beam deflected by the rotational polygon mirror 16 toward the scanning surface 17 is incident on the focal position detecting optical system which is placed adjacent to the scanning surface 17. That is, the knife edge 48 and the split photo-detecting element 49 are placed adjacent to but outside an effective scanning area on the scanning surface 17. In the focal position detecting optical system, a displacement of the focus of the light beam projected onto the scanning surface 17 is detected by the knife edge method.

The differential amplifier 50 amplifies a difference between an output from the split photodiode $49_1$ and an output from the split photodiode $49_2$, and outputs a differential signal $F_\Sigma 3$. The differential signal $F_\Sigma 3$ is sampled and held by a sample hold circuit 51, before a single scanning operation is started or after a single scanning operation has been completed, for at least each single scanning operation according to the timing signal supplied by the timing signal generating unit 26. A direct current bias voltage generating circuit 43 is controlled by the differential signal supplied by the sample hold circuit 51.

In this variation, since the direct current bias voltage generating circuit 43 is controlled by the differential signal $F_\Sigma 3$ generated by the focal point detecting means, a focal distance can be effectively controlled particularly for a gentle change in the position of the image forming point due to a temperature change of an entire image forming optical system.

It should be noted that the above-mentioned variation may be applied to the embodiments other than the first embodiment.

Figure 15:
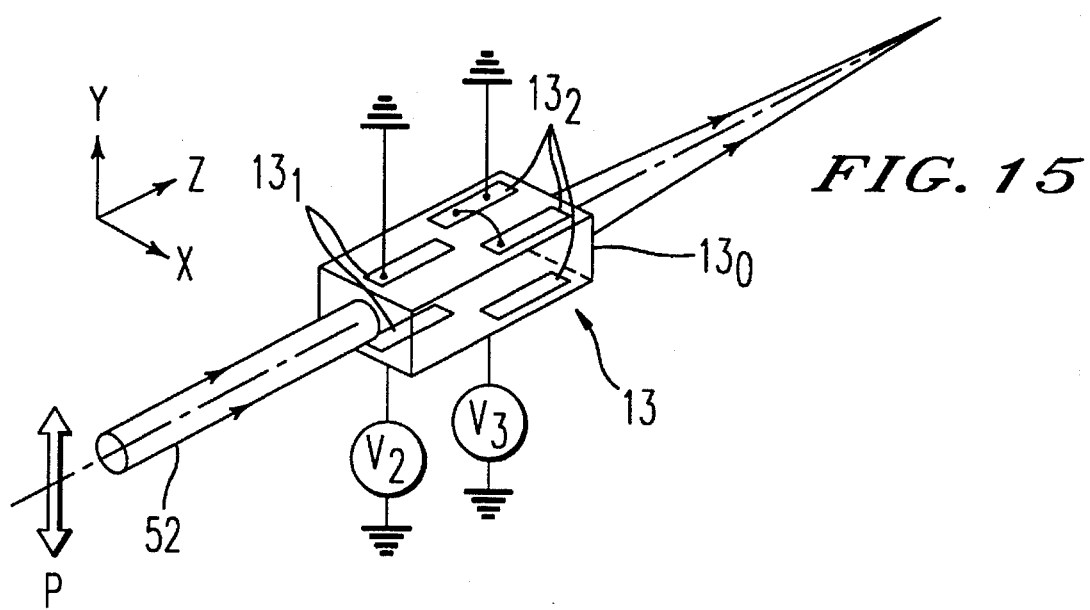
FIG. 15 is a perspective view of an example of an electrooptic lens shown in FIG. 1.

A description will now be given, with reference to FIG. 15, of an example of the above-mentioned electrooptic lens 13. FIG. 15 is a perspective view of the electrooptic lens 13.

The electrooptic lens 13 is formed of an electrooptic ceramic $13_0$ comprising PLZT. A pair of stripe electrodes $13_1$ is formed on opposite surface of the electrooptic ceramic $13_0$. Additionally, pairs of electrodes $13_2$ are formed on the opposite surfaces of the electrooptic ceramic $13_0$. The electrodes $13_1$ and $13_2$ are arranged in planes parallel to the X–Z plane.

A light beam 52 which is polarized in the Y-direction enters in the electrooptic lens 13 in the Z-direction. If a voltage V2 and a voltage V3 are applied across the electrodes $13_1$ and $13_2$, respectively, the light beam 52 is converged in the Y-direction due to the lens action of an electric field generated by the electrodes $13_1$, and is converged in the X-direction due to the lens action of an electric field generated by the electrodes $13_2$. The voltage V2 and V3 are determined so that the optical beam 52 is converged in the X-direction and the Y-direction at the same position on the Z-axis so as to obtain a spot image.

A refractive index of the electrooptic lens 13 can be approximately calculated by the following expression.

$$N_y = N_0(1 - N_0^2 R_{33} E_y^2/2)$$

where $N_O$ is a refraction index of the electrooptic ceramic $13_0$ in a state in which no electric field is generated;
$E_y$ is a Y-direction component of the electric field generated by the voltage V2;
$R_{33}$ is a secondary electrooptic coefficient of the electrooptic ceramic $13_0$.

Figure 16:
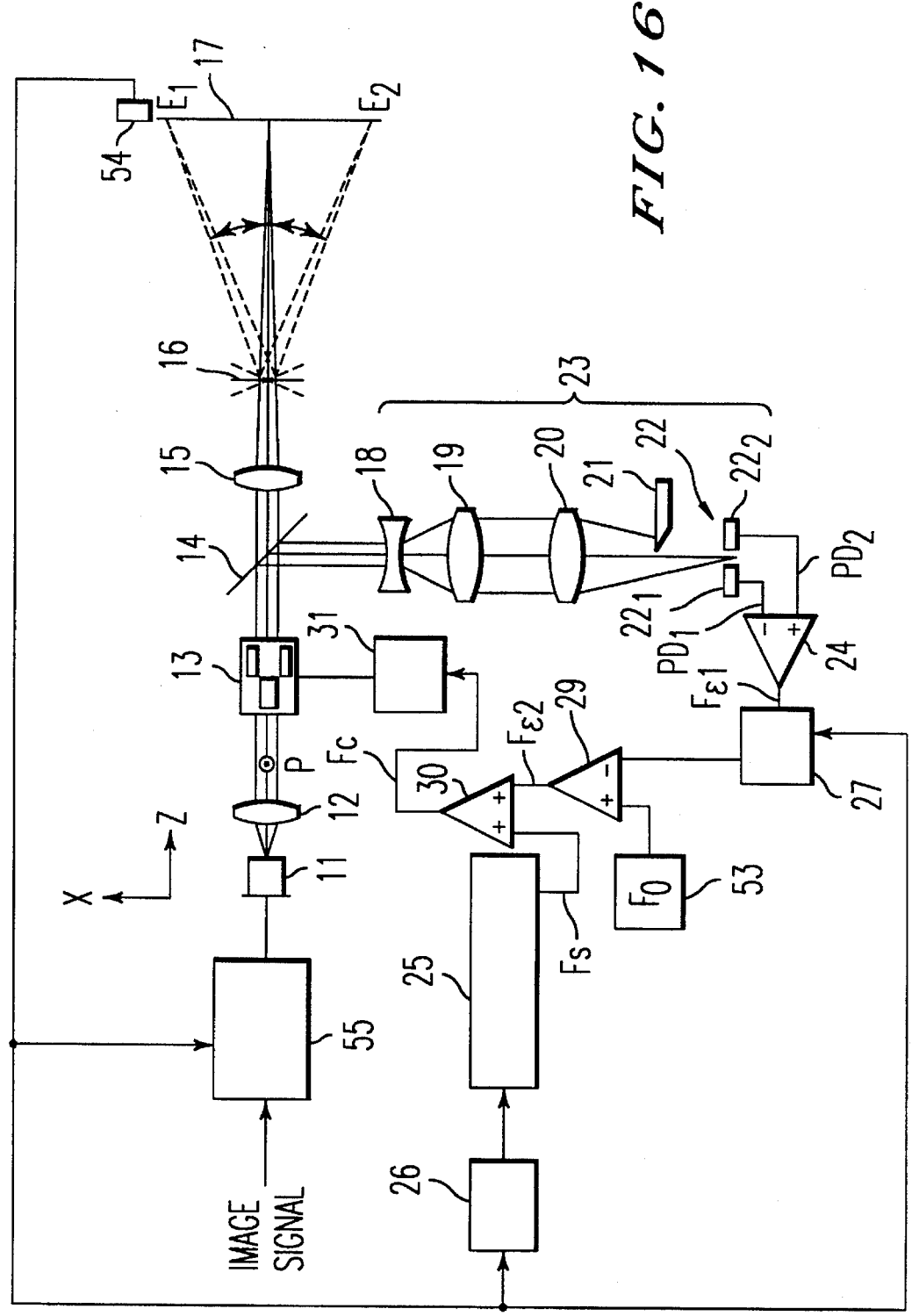
FIG. 16 is an illustration of a sixth embodiment of the optical beam scanning apparatus according to the present invention, viewed from a secondary scanning direction (Y-direction)
Figure 17:
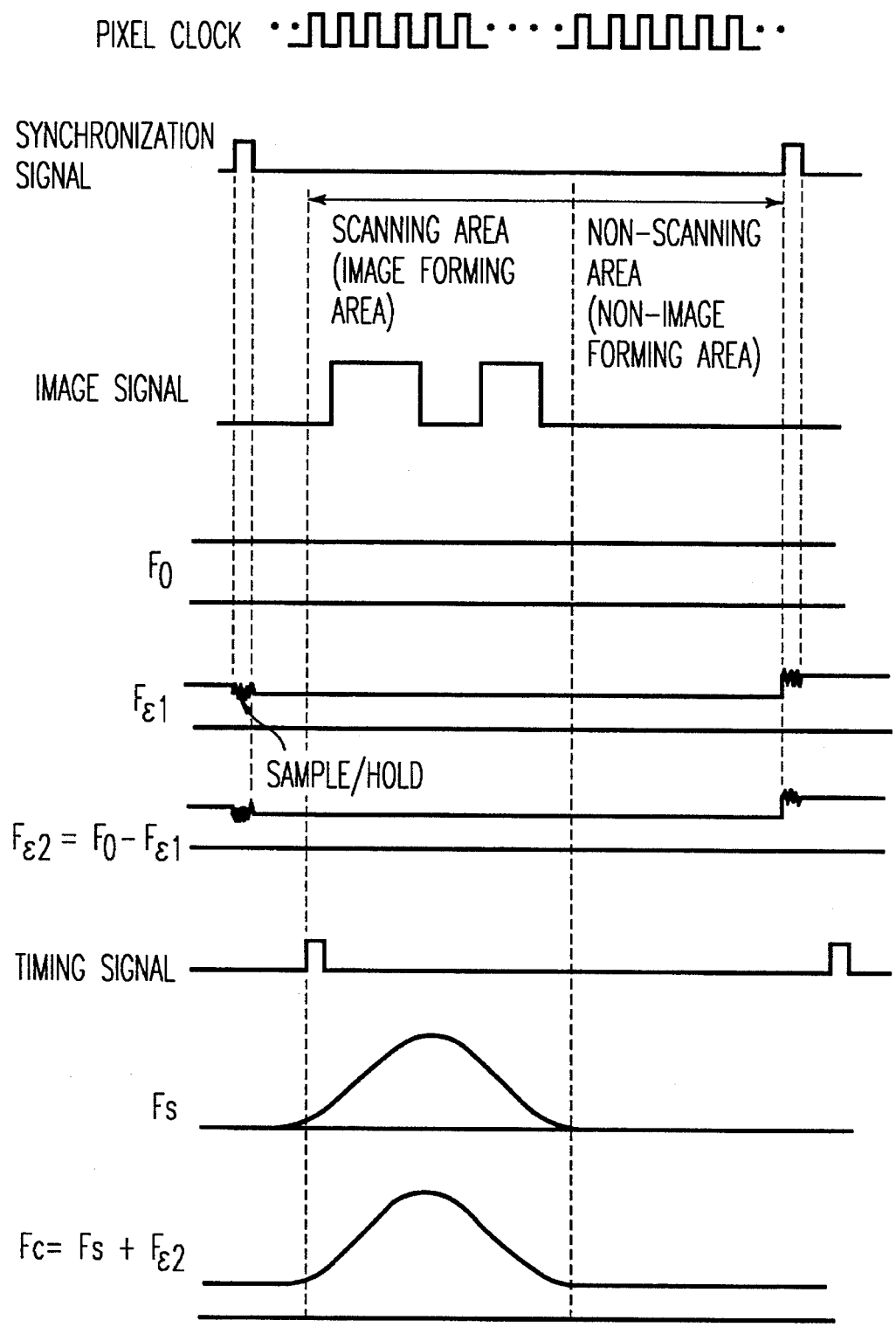
FIG. 17 is a timing chart of an operation performed in the sixth embodiment shown in FIG. 16.

A description will now be given, with reference to FIG. 16, of a sixth embodiment of an optical image scanning apparatus according to the present invention. FIG. 16 is an illustration of the sixth embodiment of the optical beam scanning apparatus according to the present invention, viewed from the secondary scanning direction (Y-direction). In FIG. 16, parts that are the same as the parts shown in FIG. 1 are given the same reference numerals, and descriptions thereof will be omitted. Additionally, FIG. 17 is a timing chart of an operation performed by the sixth embodiment.

This embodiment has the same construction as that of the above-mentioned first embodiment except for a positive input terminal of a differential amplifier 29 being connected to a direct current reference signal generating unit 53. The direct current reference signal generating unit 53 generates a constant direct current reference signal F0, and holds the signal.

A synchronization detecting unit 54 generates a synchronization signal by detecting a light beam projected from a rotational polygon mirror 16 in an area other than an image forming area on a starting side of a scanning on a scanning surface 17. A semiconductor laser driving circuit 55 turns on a semiconductor laser 11 according to the synchronization signal supplied by the synchronization signal detecting unit 54. A timing signal generating unit 26 generates various timing signals in synchronization with the synchronization signal supplied by the synchronization signal detecting unit 54. A sample hold circuit 27 samples a differential signal $F_\Sigma 1$ output from a differential amplifier 24 according to a signal supplied by the timing signal generating unit 26 before a scanning operation of an image forming area is started, and hold the sampled signal for a single scanning period. The sampled signal corresponds to the differential signal obtained in an area other than the image forming area on the starting side of a scanning operation.

A differential amplifier 29, which corresponds to differential signal generating means, compares the differential signal $F_\Sigma 1$ with the direct current reference signal F0, and outputs a resultant differential signal $F_\Sigma 2=(F0-F_\Sigma 1)$. An adder 30, which corresponds to adding means, adds the differential signal F 2 output from the differential amplifier 29 to a focusing signal Fs output from a memory unit 25 so as to obtain a driving voltage controlling signal $Fc=(F_\Sigma 2+Fs)$. The driving voltage controlling signal Fc is supplied to a driving voltage controlling circuit, and the driving voltage controlling circuit 31 applies a voltage corresponding to the driving voltage controlling signal Fc to an electrooptic lens 13 to drive the electrooptic lens 13.

In this embodiment, since the differential signal $F_\Sigma 2=(F0-Fc)$ is output from the differential amplifier 29 before a scanning operation of the image forming area is started so that a focal point of the light beam projected from the rotational polygon mirror 16 is positioned on a predetermined position, a direct current drift of the focal point of the light beam projected from the rotational polygon mirror 16 can be appropriately corrected for each single scanning line (single scanning period). That is, the direct current drift of the focal point of the scanning light beam is corrected by directly controlling a direct current bias component of the driving voltage applied to the electrooptic lens 13. Accordingly, a focal point of the scanning light beam can always be positioned on the scanning surface 17 particularly for a gentle change in the focal position due to a temperature change.

It should be noted that, as shown in FIG. 17, the memory unit 25 starts to output the focusing signal Fs according to the timing signal supplied by the timing signal generating unit 26.

In the above-mentioned sixth embodiment, the differential signal $F_\Sigma 1$ may be sampled when a scanning operation for each frame is started. That is, the focusing signal Fs is updated for each frame.

Figure 18:
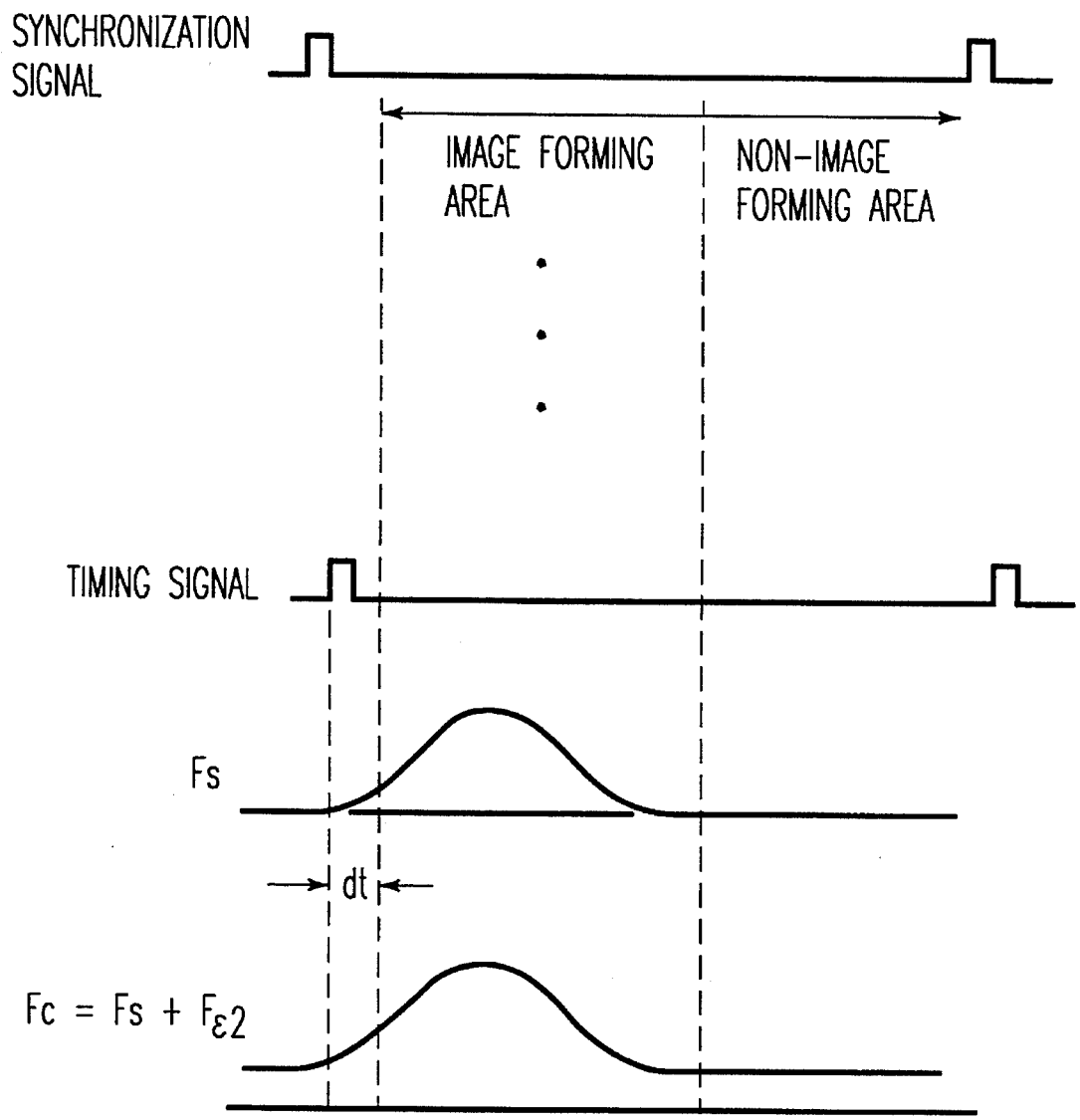
FIG. 18 is a timing chart for supplying a focusing signal.

Additionally, in the above-mentioned sixth embodiment, as shown in FIG. 18, the timing signal output from the timing signal generating unit 26 may be supplied to the memory unit 25 prior to a start time of the scanning operation for the image forming area by a duration corresponding to a response time dt of the electrooptic lens 13. That is, the focusing signal is supplied the response time dt before the scanning operation for forming an image on the scanning surface 17. Accordingly, a displacement of the focal point due to a response delay of the electrooptic lens 13 can be corrected.

Figure 19:
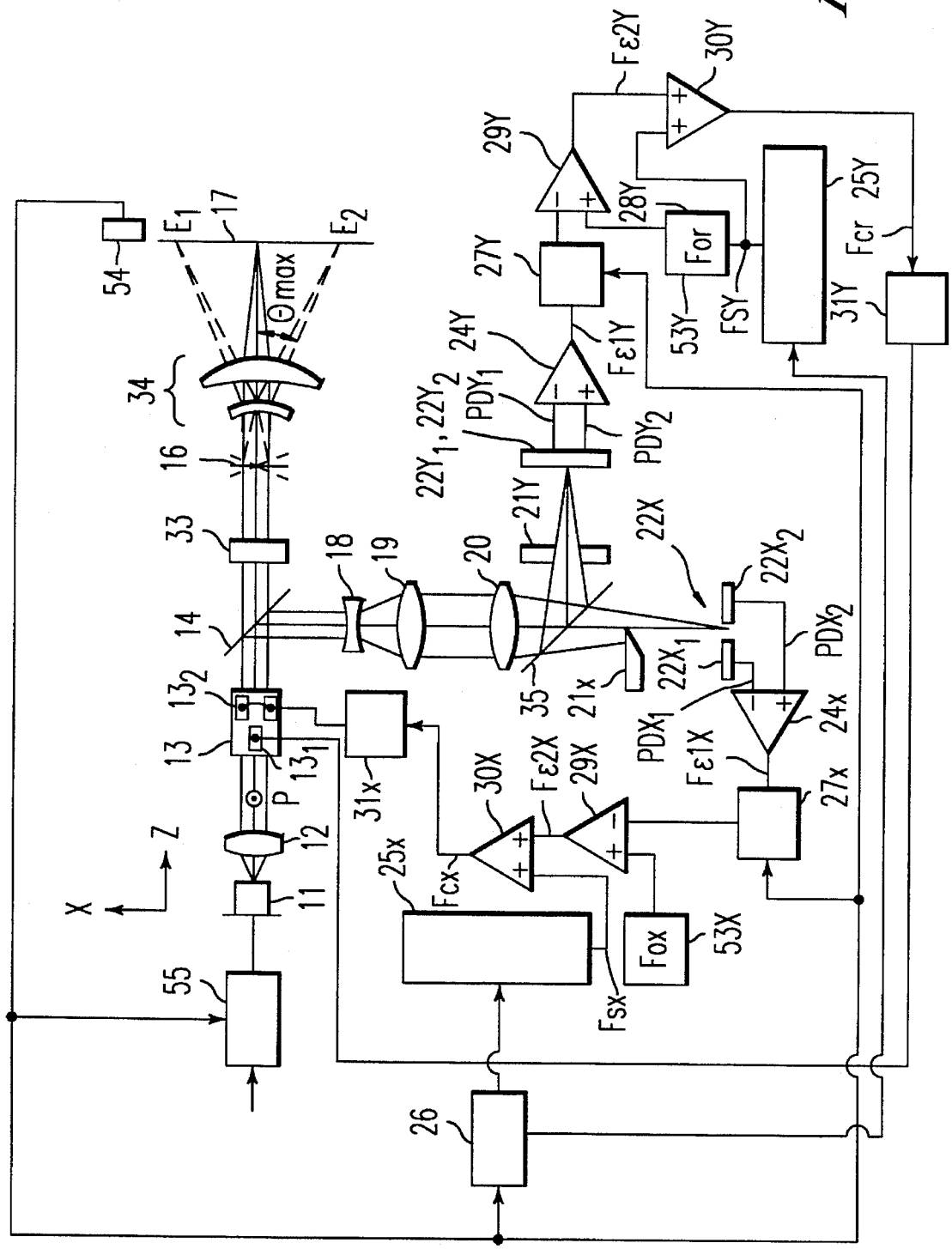
FIG. 19 is an illustration of a seventh embodiment of the optical beam scanning apparatus according to the present invention, viewed from a secondary scanning direction (Y-direction).

A description will now be given, with reference to FIG. 19, of a seventh embodiment of an optical image scanning apparatus according to the present invention. FIG. 19 is an illustration of a seventh embodiment of the optical beam scanning apparatus according to the present invention, viewed from a secondary scanning direction (Y-direction). In FIG. 19 parts that are the same as the parts shown in FIG. 5 and 16 are given the same reference numerals, and descriptions thereof will be omitted.

The seventh embodiment of the present invention is a combination of the third embodiment shown in FIG. 5 and the sixth embodiment shown in FIG. 16. This embodiment has the same construction as that of the above-mentioned third embodiment except for positive input terminals of differential amplifiers 29X and 29Y being connected to direct current reference signal generating unit 53X and 53Y, respectively. The direct current reference signal generating units 53X and 53Y generate constant direct current reference signals $F_\Sigma 1X$ and $F_\Sigma Y1$, and hold the signals.

A synchronization detecting unit 54 generates a synchronization signal by detecting a light beam projected from a rotational polygon mirror 16 in an area other than an image forming area on a starting side of a scanning on a scanning surface 17. A semiconductor laser driving circuit 55 turns on a semiconductor laser 11 according to the synchronization signal supplied by the synchronization signal detecting unit 54. A timing signal generating unit 26 generates various timing signals in synchronization with the synchronization signal supplied by the synchronization signal detecting unit 54. Sample hold circuits 27X and 27Y sample differential signals $F_\Sigma 1X$ and $F_\Sigma 1Y$ output from respective differential amplifiers 24X and 24Y according to a signal supplied by the timing signal generating unit 26 before a scanning operation of an image forming area is started, and hold the sampled signals for a single scanning period. The sampled signals correspond to the respective differential signals obtained in an area other than the image forming area on the starting side of a scanning operation.

Differential amplifiers 29X and 29Y compare the differential signals $F_\Sigma 1X$ and $F_\Sigma 1Y$ with the direct current reference signals F0X and F0Y, and output resultant differential signals $F_\Sigma 2X=(F0x-F_\Sigma 1X)$ and $F_\Sigma 2Y=(F0Y-F_\Sigma 1Y)$, respectively. Adders 30 add the differential signal $F_\Sigma 2X$ and $F_\Sigma 2Y$ output from the differential amplifiers 29X and 29Y to focusing signals Fsx and Fsy output from memory units 25X and 25Y so as to obtain driving voltage controlling signals $Fcx=(F_\Sigma 2X+Fsx)$ and $Fcy=(F_\Sigma 2Y+Fsy)$, respectively. The driving voltage controlling signals Fcx and Fcy are supplied to corresponding driving voltage controlling circuits 31X and 31Y, and the driving voltage controlling circuits 31X and 31Y apply voltages corresponding to the driving voltage controlling signals Fcx and Fcy to an electrooptic lens 13 to drive the electrooptic lens 13.

In this embodiment, since the differential signals $F_\Sigma 2X=(FOX-Fcx)$ and $F_\Sigma 2Y=(FOY-Fcy)$ are output from the differential amplifiers 29X and 29Y before a scanning operation of the image forming area is started so that a focal point of the light beam projected from the rotational polygon mirror 16 is positioned on a predetermined position, a direct current drift of the focal point of the light beam projected from the rotational polygon mirror 16 in the main scanning direction and the secondary scanning direction can be appropriately corrected for each single scanning line (single scanning period). That is, the direct current drift of the focal point of the scanning light beam in the main scanning direction and the secondary scanning direction are corrected by directly controlling a direct current bias component of the driving voltages applied to the electrooptic lens 13. Accordingly, a focal point of the scanning light beam can always be positioned on the scanning surface 17 particularly for a gentle change in the focal position due to a temperature change.

In the above-mentioned seventh embodiment, the differential signals $F_\Sigma 1X$ and $F_\Sigma 1Y$ may be sampled when a scanning operation for each frame is started. That is, the focusing signals Fsx and Fsy are updated for each frame.

Additionally, in the above-mentioned seventh embodiment, the timing signal output from the timing signal generating unit 26 may be supplied to the memory units 25X and 25Y prior to a start time of the scanning operation for the image forming area by a duration corresponding to a response time dt of the electrooptic lens 13. That is, the focusing signals are supplied the response time dt before the scanning operation for forming an image on the scanning surface 17. Accordingly, a displacement of the focal point due to a response delay of the electrooptic lens 13 can be corrected in the primary scanning direction and the secondary scanning direction.

Additionally, the features of the above-mentioned first to sixth embodiments and variations thereof may be applied to the seventh embodiment without departing from the scope of the present invention.

The present invention is not limited to the specifically described embodiments, and variations and modifications may be made without departing form the scope of the present invention.

What is claimed is:

1. An optical beam scanning apparatus comprising:

a light source emitting a linearly polarized light beam;

deflecting means for deflecting the light beam toward a scanning surface on which an image is formed a scanning operation defined by the light beam projected from said deflecting means onto said scanning surface;

a first image forming optical system provided between said light source and said deflecting means focusing the light beam on said scanning surface, said first image forming optical system including an electrooptic lens having a variable focal distance so that a focal distance of said first image forming optical system is varied in synchronization with said scanning operation;

light beam splitting means for splitting the light beam after the light beam has passed through said electrooptic lens into a first split light beam and a second split light beam, said first split light beam being directed toward said deflecting means;

focal position detecting means for detecting a deviation of a focal position of said first split light beam relative to said scanning surface by use of said second split light beam, and for outputting a detection signal corresponding to the deviation of the focal position;

focusing signal supplying means for storing and supplying a focusing signal which corresponds to the detection signal obtained when a focal position of said first split light beam is positioned on said scanning surface;

direct current reference signal generating means for generating and outputting a direct current reference signal having a predetermined constant level;

differential signal generating means for generating a differential signal between the direct current reference signal output from said direct current reference signal generating means and the detection signal output from said focal position detecting means;

driving voltage generating means for generating a driving voltage supplied to said electrooptic lens, the driving voltage being controlled by a driving voltage controlling signal which is a sum of the differential signal output from said differential signal generating means and the focusing signal output from said focusing signal supplying means; and synchronization signal generating means, provided adjacent to said scanning surface, for generating a synchronization signal by detecting the light beam projected from said deflecting means onto said scanning surface, the synchronization signal used for controlling starting timing for a scanning operation and an output timing for outputting the detection signal from said focal position detecting means so that the differential signal is output for each scanning period in the absence of an image being formed on said scanning surface.

2. The optical beam scanning apparatus as claimed in claim 1, wherein the synchronization signal is supplied for a scanning operation which corresponds to each frame of an image formed on said scanning surface so that a level of the direct current reference signal is constant for each frame period.

3. The optical beam scanning apparatus as claimed in claim 2, wherein a timing signal obtained from the synchronization signal is supplied to said focusing signal generating means for a predetermined duration before a scanning operation for an image forming area on said scanning surface is started so that the voltage controlling signal is output for said predetermined duration before the scanning operation for the image forming area is started.

4. The optical beam scanning apparatus as claimed in claim 3, wherein said predetermined duration corresponds to a response time of said electrooptic lens.

5. The optical beam scanning apparatus as claimed in claim 1, wherein a beam expanding optical system is provided between said electrooptic lens and said deflecting means.

6. The optical beam scanning apparatus as claimed in claim 1, further comprising a second image forming optical system provided between said deflecting means and said scanning surface to correct a distortion of an image formed on said scanning surface generated by said deflecting means, wherein said electrooptic lens comprises a first electrooptic lens unit and a second electrooptic lens unit, said first electrooptic lens unit having a power in a first direction and said second electrooptic lens unit having a power in a second direction perpendicular to said first direction, said first direction corresponding to a primary scanning direction and said second direction corresponding to a secondary scanning direction;

said focal position detecting means comprises a first focal position detecting means and a second focal position detecting means, said first focal position detecting means detecting a deviation of the focal position of said first split light beam in said first direction and outputting a first detection signal, said second focal position detecting means detecting a deviation of the focal position of said first split light beam in said second direction, and outputting a second detection signal;

said focusing signal supplying means comprises a first focusing signal supplying means and a second focusing signal supplying means, said first focusing signal supplying means storing and supplying a first focusing signal which corresponds to said first detection signal derived when the focal position of said first split light beam is positioned on said scanning surface in said first direction, said second focusing signal supplying means storing and supplying a second focusing signal which corresponds to said second detection signal derived when the focal position of said first split light beam is positioned on said scanning surface in said second direction;

said direct current reference signal generating means comprises a first direct current reference signal generating means and second direct current reference signal generating means, said first direct current generating means generating and outputting a first direct current reference signal having a first predetermined constant level, said second direct current generating means generating and outputting a second direct current reference signal having a second predetermined constant level;

said differential signal generating means comprises a first differential signal generating means and a second differential signal generating means, said first differential signal generating means generating a first differential signal by a difference between the direct current reference signal output from said first direct current reference signal generating means and the first detection signal output from said first focal position detecting means, said second differential signal generating means generating a second differential signal by a difference between the second direct current reference signal output from said first direct current reference signal generating means and the second detection signal output from said second focal position detecting means;

said driving voltage generating means comprises a first driving voltage generating means and a second driving voltage generating means, said first driving voltage generating means generating a first driving voltage supplied to said first electrooptic lens unit, the first driving voltage controlled by a first driving voltage controlling signal which is a sum of the first differential signal output from said first differential signal generating means and the first focusing signal output from said first focusing signal supplying means, said second driving voltage generating means generating a second driving voltage supplied to said second electrooptic lens unit, the second driving voltage controlled by a second driving voltage controlling signal which is a sum of the second differential signal output from said second differential signal generating means and the second focusing signal output from said second focusing signal supplying means; and the synchronization signal controlling starting timing for a scanning operation and output timings for outputting the first and second detection signals from said first and second focal position detecting means so that the first and second differential signals are output for each scanning period in the absence of an image being formed on said scanning surface.

7. The optical beam scanning apparatus as claimed in claim 6, further comprising a first cylindrical lens, a second cylindrical lens, a third cylindrical lens and a fourth cylindrical lens, said first cylindrical lens and said second cylindrical lens having a power in said first direction, said third cylindrical lens and said fourth cylindrical lens having a power in said second direction, wherein said second electrooptic lens unit provided between said first cylindrical lens and said second cylindrical lens so that the light beam exiting from said first cylindrical lens enters said second electrooptic lens unit substantially a waist position of the light beam exiting from said first cylindrical lens, and so that the light beam exiting from said second electrooptic lens unit is converted into a substantially parallel beam by said second cylindrical lens; and said first electrooptic lens unit provided between said third cylindrical lens and said fourth cylindrical lens so that the light beam exiting from said third cylindrical lens enters said first electrooptic lens unit substantially a waist position of the light beam exiting from said third cylindrical lens, and so that the light beam exiting from said first electrooptic lens unit is converted into a substantially parallel beam by said fourth cylindrical lens.

* * * * *